Feb. 21, 1967 — W. L. DARROW ET AL — 3,305,355

REFINING OF FERROPHOS

Filed Oct. 31, 1962

INVENTORS:
WENDELL L. DARROW &
CHAO HSIAO

BY
ATTORNEYS 3,305,355
REFINING OF FERROPHOS
Wendell L. Darrow, Darien, Conn., and Chao Hsiao, Alameda, Idaho, assignors to FMC Corporation, New York, N.Y., a corporation of Delaware
Filed Oct. 31, 1962, Ser. No. 234,390
6 Claims. (Cl. 75—132)

This invention relates to the processing of vanadium and chromium bearing ferrophos, and particularly to the processing of crude ferrophos to provide a refined ferrophos having a high and reproducible phosphorus content, along with a concentrate containing the bulk of the valuable vanadium and chromium present in the crude ferrophos.

There exist in the United States, and particularly in the western part of the United States, large deposits of phosphate rock containing up to 34% of $P_2O_5$ in the form of dry calcium phosphate. The calcium content of this ore is about 30 to 50%, expressed as CaO. The ore also contains silica, iron oxide, organic matter and clay as well as small quantities of chromium oxide and vanadium oxide. The vanadium is present in the ore in the amount of about 0.05% to 1% as $V_2O_5$.

Conventionally, the ore is treated for the extraction of its contained phosphorus by smelting in an electric furnace with coke under reducing conditions, whereby the phosphorus is volatilized as elemental phosphorus and condensed and recovered. The iron oxide in the ore, together with the vanadium and chromium oxides in it, is reduced to a metal alloy, crude ferrophos, which contains about 24 to 28% phosphorus, 52 to 60% iron, 3½ to 8% vanadium and 2 to 6% chromium.

The ferrophos has found use in the steel industry, where it is employed as a source of high-phosphorus iron. However, in this market the valuable vanadium and chromium present in the alloy confer no advantage, and accordingly are wasted. Furthermore, the vanadium and chromium vary in concentration in the ferrophos, and this variability has been found to interfere seriously with the production of quality steel from the ferrophos.

It has been desired to provide a method for producing a ferrophos which contains controlled amounts of vanadium and chromium, and yet which has a high and constant phosphorus content, such that the ferrophos is suitable directly for use in iron treatment. It has been desired also to provide a method for removing the vanadium from the crude ferrophos in a form in which it can be recovered readily and in pure form.

Copending patent application Serial No. 120,881, assigned in part to the assignee of this application filed June 27, 1961 and now U.S. Patent No. 3,154,410, discloses a method for treating crude ferrophos to provide a refined ferrophos along with a concentrate containing vanadium and chromium from the crude ferrophos. Crude ferrophos is heated in a molten condition in an oxidizing atmosphere with control of the temperature of the reaction mixture to from about 1300° to about 1560° C. This treatment provides a concentrate rich in vanadium and chromium, which can be separated readily in solid or molten form from residual ferrophos.

Control of temperature causes the vanadium and chromium to be oxidized preferentially, so that the bulk of the phosphorus remains in the ferrophos which can be employed in manufacture of steel, while the concentrate can be employed to produce vanadium and chromium. The vanadium is oxidized to its high oxidation form, likely as $V_2O_5$, in which it can be converted selectively to water soluble sodium vanadate by simple salt roasting, and thus can be extracted readily and further processed to produce prue vanadium metal or pure vanadium oxides.

The process of Serial No. 120,881 now U.S. Patent No. 3,154,410, made it possible for the first time to selectively remove vanadium and chromium from crude ferrophos, while not volatilizing undue amounts of phosphorus. Prior uncontrolled methods of treating crude ferrophos lacked selectivity, with the result that phosphorus was evolved in uncontrolled amounts. This meant that the by-product containing variable amounts of vanadium and chromium, as well as the residual ferrophos, had variable and unpredictable phosphorus contents which caused them to require extensive processing before final use.

While the process for refining ferrophos by controlling the temperature of operation recited in Serial No. 120,881 now U.S. Patent No. 3,154,410, represented an important advance over prior methods, it left certain problems. It is basic to the process that the temperature be controlled closely; the process must be operated above about 1300° C. or the ferrophos melt will be too viscous and the concentrate will not separate, and also the reaction will be uneconomically slow. Furthermore, if the reaction temperature is below about 1300° C. with air addition being kept down to avoid a large exotherm, the vanadium is not oxidized to a high enough level and is not readily recoverable from the concentrate. The reaction also must be conducted below about 1560° C., or an undue amount of phosphorus is oxidized along with the vanadium and chromium; furthermore, the oxidation above this temperature is uncontrolled and the residual ferrophos product is unpredictable and not useful directly in steelmaking.

Since the oxidation reaction is exothermic and close temperature control is vital, it is essential that it be possible to effect rapid adjustment of temperature. This places a great strain on equipment in which the oxidation is carried out, it being necessary at times to create a large temperature differential across such equipment. Materials of construction recommended for use at high temperatures in oxidative metallurgical processes, the usual oxide refractories such as silica, have been found to corrode and fracture after one heat cycle.

It therefore has been necessary to compromise production rate by feeding reactants slowly, introducing less air and operating at the lower end of the temperature range of 1300° to 1560° C. in order that large exotherms would not be encountered. In addition to slowing production, this causes the vanadium in the concentrate to be oxidized to lower oxidation levels than the $V_2O_5$ form in which it can be readily recovered. Likewise, it has meant that when the temperature has surged even temporarily above 1560° C. an occurrence especially encountered when reactions are run over a long period, it has been necessary to hold the rate of cooling to within the capacity of the equipment to transfer heat without failure, so that often excessive amounts of phosphorous have been lost.

It has been desired, therefore, to provide a reactor for refining ferrophos which would permit close and rapid control of reaction temperature by removing any excessive oxidation heat such that the reaction could be conducted at any desired temperature within the range of 1300° to 1560° C. and at a high rate of feed of ferrophos and oxidative gases without loss of excessive amounts of phosphorus from the ferrophos, and without failure of equipment.

It has now been found, quite surprisingly, that the temperature of a ferrophos roast can be maintained within close limits and a refined ferrophos of predetermined composition and a useful concentrate high in vanadium and chromium can be produced, even though the reaction is conducted at a very high rate, by heating crude ferrophos in a molten condition in an oxidizing atmosphere at a temperature of about 1300° C. to 1560° C. to form a molten, refined ferrophos and a separate, recoverable concentrate containing oxidized vanadium and chromium, provided the reaction is carried out in a reactor which is lined with a silicon carbide refractory where it contacts the molten ferrophos.

This use of silicon carbide as the oxidation furnace lining overcomes corrosion and permits the operator to cool the furnace where required by application of cooling water or other media to the exterior of the furnace, which would not be possible with other furnace linings due to their poor thermal conductivity and susceptibility to cracking on encountering thermal shock. This in turn permits more rapid feed of crude ferrophos and oxidative gases, and consequently a higher rate of production without sacrificing the quality of the refined ferrophos or the vanadium- and chromium-containing concentrate.

The ability of the silicon carbide, a material not usually considered useful in oxidative processes, to withstand the rigorous chemical and thermal conditions generated in the ferrophos oxidation is particularly surprising when it is realized that materials normally used as furnace refractories for metallurgical applications fail in the present application. Thus, silica, alumina, various aluminum silicates and the like are not suitable and operations in which they are used yield low quality ferrophos and concentrate at a lower rate of production than are achieved when silicon carbide is used.

The present invention will now be described more fully with reference to the attached drawings, in which.

Figure 1:
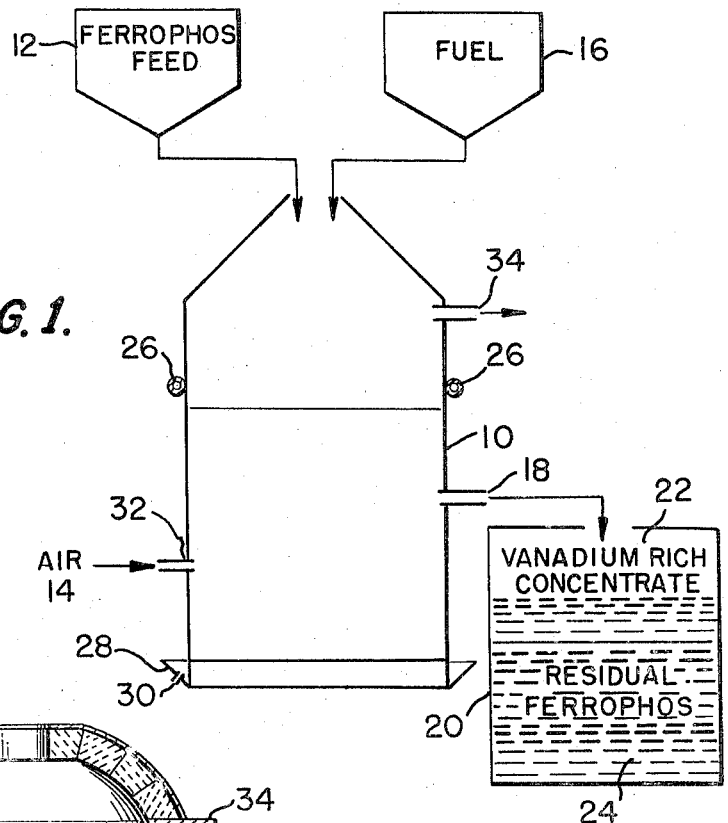
FIG. 1 represents a system for processing of ferrophos.

Referring now to FIG. 1, 10 represents a reaction furnace or converter into which ferrophos feed 12 and air 14 are introduced. The ferrophos preferably is introduced in solid form and melted initially by heat derived from burning coke or other fuel 16, although it may be introduced in molten form. In either case, air is blown through the molten ferrophos, and the exothermal oxidation reaction provides sufficient heat to continue the oxidation which forms a mixture of residual refined ferrophos and a concentrate containing vanadium and chromium oxides.

The mixture of vanadium concentrate and residual ferrophos is then tapped from the tap hole 18 and is permitted to cool in quiescent condition, for example in a ladle 20 whereupon the concentrate 22 rises to the surface of the residual ferrophos 24 from which it can be separated from the remaining batch either in liquid or cooled, solid state. The furnace 10 is equipped with a cooling water spray ring 26 or the like for introducing cooling water to the outside of the furnace. The water is collected in water bird bath 28 and removed through port 30. Air is introduced into furnace 10 through tuyeres 32, and exit gases removed through port 34.

The concentrate at this point contains about 10 to 15% of vanadium as $V_2O_5$, 8 to 12% of chromium as $Cr_2O_3$, about 30% of phosphorus as $P_2O_5$, and the balance principally iron oxides, with silica and calcium being present in small amounts. The residual ferrophos contains at least about 23% of phosphorus, a condition in which it is highly useful in steel manufacture.

Figure 2:
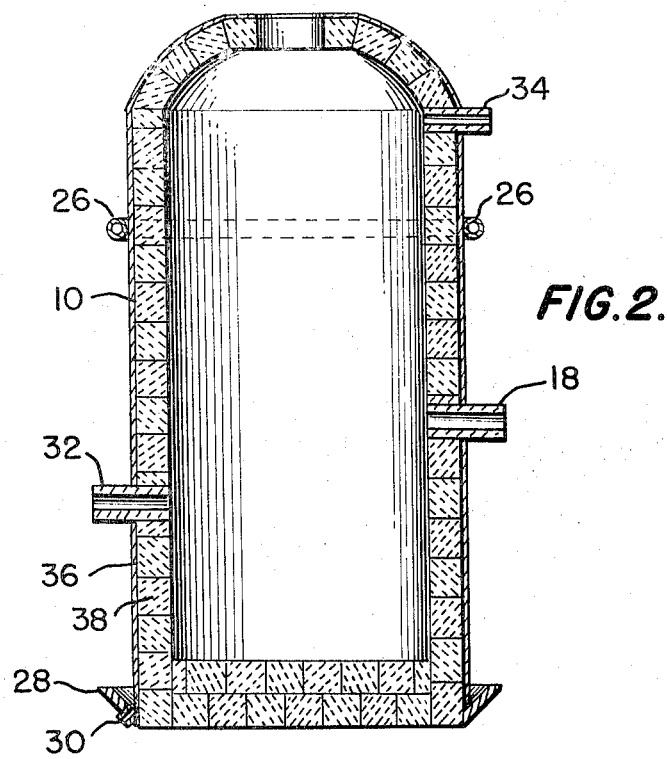
FIG. 2 represents a sectional side view of a typical furnace employed in the herein process.

Referring now to FIG. 2, a cross section of a useful furnace is shown. This furnace has a shell wall 36 of steel and a silicon carbide brick lining 38 in contact therewith. Tuyeres 32 of silicon carbide likewise are shown and serve as a port for entry of air or other oxidizing gases, while tap holes 18 serve as ports for removal of reaction products.

The brick lining 38 will crack or spall in use if it is unable to withstand the thermal or chemical conditions encountered in the furnace reactor. Silica bricks when used in this furnace for the refining of ferrophos were fractured and cracked after one heat cycle; this fracturing was quite evident, some bricks breaking into numerous pieces. It is apparent that a lining which has undergone failure of this sort will no longer serve its function or containing the reaction mass and keeping it from contact with the reactor shell.

The silicon carbide refractory employed herein will normally be formed by bonding together particles of this material, which may be prepared by heating sand and coke in an electric furnace to provide large aggregates of silicon carbide crystals. These aggregates are crushed to provide grains of the silicon carbide, normally having particle sizes up to on the order of 10 mesh, although larger particles may be employed in producing suitable refractories.

The grains of silicon carbide are then bonded together by the application of heat and pressure, by any of several well-known means, for example, they may be bonded directly to each other by the application of heat and pressure in either a reducing or an oxidizing atmosphere, such that the grains are caused to sinter together. This heating and pressing operation will normally be carried out at a temperature well below the 2700° C. melting temperature of the silicon carbide. Alternately, the particles may be bonded together chemically with other refractories such as oxides, nitrides or oxynitrides which will soften to bond the grains at a temperature below that which the silicon carbide will soften and flow.

Selection of the proper chemical bonding agent will be made primarily on the basis of the temperature at which it will bond. It of course is important to employ a bonding agent which will not soften at an unduly low temperature, such that it will be able to withstand the above 1560° C. temperatures encountered in the present ferrophos process. Typically useful bonding agents will include silicon nitride, vanadium nitride, aluminum nitride, barium nitride and the like nitrides, cobalt oxide, lithium oxide, silicon oxide, zinc oxide and other oxides, and oxynitrides of these or other metals as well as other additives such as metal aluminates, silicates, titanates, borides, carbides and the like additives which will serve as bonding agents at proper temperatures. The amount of chemical bonding agent employed normally will be less than 1% of the total weight of the refractory.

The silicon carbide normally will be employed in brick form to line the reactor walls, the bricks preferably but not critically having a dimension of about 3 inches by 5 inches by 9 inches. The bricks will be formed in the usual fashion to conform to the shape of the furnace to be lined, and where the wall has a curvature, the bricks will be shaped such that they will fit to the wall with the face of the brick which contacts the inside of the wall having a larger dimension than the side of the brick away from the wall. This will cause the bricks to lock together mechanically and remain in position in the furnace without an adhesive agent between bricks. However, where it is desired, an adhesive agent may be employed.

The bored blocks or the like used as tuyeres and tapholes in the reactor will be formed by machining preformed blocks of the silicon carbide refractory or by molding the particles directly into the desired shape. Normally the outer wall of the furnace will be formed of steel, although other metals or materials of construction may be employed.

Ferrophos obtained from western United States phosphate ores is preferred for use in the present process. This particular ore contains a large amount of vanadium, as much as about 1% expressed as $V_2O_5$ and accordingly its recovery is economically attractive. However, ferrophos derived from ores containing less vanadium may be processed by the present method, although it will be apparent that the smaller vanadium content of other ores reduces the economic attractiveness of the process insofar as vanadium recovery is concerned. The western ores likewise contain large amounts of chromium, making its recovery also attractive.

The concentrate is formed by heating the ferrophos in molten condition under oxidizing conditions in typical oxidation equipment such as a Bessemer converter equipped with the herein silicon carbide lining including silicon carbide tuyeres and silicon carbide tap holes. The oxidation is controlled carefully to from about 1300° C. to a maximum of 1560° C., and preferably between 1400° and 1500° C., and is run with a flow of air as the oxidizing gas in the amount of 12 to 15 standard cubic feet per pound of crude ferrophos. At temperatures below about 1300° C. the burden in the reactor is highly viscous and the required separation of concentrate from the ferrophos does not occur. Furthermore, at temperatures as low as 1300° C. and when substantially less than the indicated amount of air is employed, the vanadium will not wholly convert to the highly oxidized $V_2O_5$ form, and thus will not be in a state where it can be recovered readily in later processing of the concentrate.

If the exothermal reaction heat is not removed through the lining of the reactor, an excess of solid ferrophos has to be fed into the reactor to lower the charge temperature. Therefore the air to ferrophos ratio would be reduced from a desirable 12–15 standard cubic feet per pound of ferrophos to levels as low as 7–9 standard cubic feet per pound, which would cause the vanadium concentrate to be at a low oxidation level and vanadium recovery efficiency would be reduced considerably. At temperatures above about 1560° C., an undue amount of phosphorus is volatilized and lost overhead. This means that control of the phosphorus, vanadium and chromium content in the residual ferrophos is difficult, and furthermore that the amount of phosphorus in the ferrophos is reduced to an undesirable extent.

Since the oxidation is an exothermic reaction and undesired reactions occur above about 1560° C., it is most important to provide for control of temperture. While means such as return of solid ferrophos in addition to that required for reaction, or addition of other iron-containing agents such as cast iron, magnetite and the like to the molten bath will effect some temperature control, this reduces the rate of throughput, dilutes phosphorus content in the residual ferrophos and does not provide uniform cooling. A very useful and practical technique for reducing the charge temperature is spraying water on the exterior of the reactor, a means which permits both rapid and uniform temperature control. Until discovery of the unique characteristics of the present silicon carbide furnace lining in the herein process, however, this close control of temperature was not possible as other furnace lining materials would not withstand the severe thermal shock caused by cooling the exterior reactor wall in the presence of the oxidative and otherwise highly corrosive atmosphere of the ferrophos charge. In addition the high thermal conductivity of silicon carbide helps to remove excessive oxidation heat. Thus more air can be introduced and a high oxidation level vanadium concentrate can be produced.

The measurement of temperature in the present process is made at the bottom tap hole, for example with an optical pyrometer, for the reason that the batch is sufficiently corrosive to temperature measuring means placed within it to make more direct measurement means impractical. Furthermore, the presence of phosphorus vapors over the molten batch renders optical measurements from above difficult, if not impossible.

The oxidation of the crude ferrophos is preferably continued until at least about 50% but no more than about 95% of the vanadium in the ferrophos is converted to vanadium oxides, and no more than about 1% of vanadium remains in the residue. Economically, it is not desirable to leave more than this amount of vanadium in the ferrophos as it is not useful in the ferrophos and therefore confers no economic advantage. It is also not suitable to convert more than about 95% of the vanadium to its oxides, as in converting the remainder above the 95% level an undue amount of phosphorus and iron may be oxidized and lost.

The state of oxidation of the vanadium is important to subsequent recovery of that material. The oxidation occurring when about 12 to 15 standard cubic feet of air or its oxidation equivalent, e.g. oxygen enriched air introducing a like amount of oxygen, is fed per pound of crude ferrophos provides a form of vanadium which converts readily to water-soluble sodium vanadate by salt roasting. It is believed the oxidation level is at $V_2O_5$, although the correctness of this theory does not affect the validity of the fact that the vanadium is readily recoverable when oxidation of the ferrophos is carried out at this air feed level.

The concentrate derived is easily processed for recovery of vanadium and chromium. For example, the concentrate may be removed from the furnace by tapping, pouring or skimming, although it may be permitted to cool and solidify and be removed in solid form. The separated concentrate may then be converted to particulate form to provide particles which will pass through a 60 mesh screen, and these particles mixed with sufficient sodium chloride to react with all of the vanadium, iron, silica and other constituents and the mixture roasted under oxidizing conditions at a temperature of about 600° to 800° C. for about 1 to 2 hours. The amount of salt employed will be about 1 to 3 times the amount of vanadium chloride. The roast selectively converts vanadium in the concentrate which has been oxidized in the roast of crude ferrophos to the $V_2O_5$ oxidation level, to the water-soluble sodium vanadate, that is, $Na_2V_2O_7$. Vanadium oxidized to lower levels is not so easily recoverable.

The ferrophos can be treated by the present process to contain any amount of phosphorus desired, preferably between 23 to 25% of phosphorus. Ferrophos containing this amount of phosphorus may be employed directly in steelmaking.

The following examples are presented by way of illustration only and are not intended to limit the scope of the present invention in any way.

*Example 1.—Silicon carbide lined reactor*

Six tons of ferrophos comprising 27.5% phosphorus, 4.9% vanadium, 4.8% chromium and 57.1% iron was introduced over three hours into a Bessemer converter 18 feet high and 8 feet in diameter. The converter was equipped with a tap hole located about 3 feet, 3 inches above the bottom of the converter and a second tap hole located 4 feet 2 inches above the bottom of the converter. The converter was composed of a steel shell lined with silicon nitride-bonded silicon carbide brick lining measuring 9 inches in thickness in areas in contact with reaction charge. Tuyeres were located around the bottom of the reactor for introduction of air, and these and the tap holes were lined with silicon carbide refractory which had been molded to form blocks. The taphole blocks were 18 inches long and had an inner bore diameter of 3½ inches and an outer dimension of 6 inches by 7 inches. The tuyere blocks were 14 inches long and had an inner diameter of 0.9 inch and outer dimensions of 5 inches by 5 inches.

The temperature of the charge was raised to about 1100° C. during its introduction to the converter by burning coke beneath it. The temperature of the charge during the operation from that point on was maintained by blowing air into the charge through the tuyeres located 3 feet 9 inches up from the bottom of the converter at a rate of 2000 standard cubic feet per minute. This addition of air caused an exothermal reaction to occur, the temperature of which was maintained at about 1500° C. by spraying water on the outside of the converter.

Solid ferrophos was introduced into the top of the converter at the rate of 4.8 tons per hour over a period of 120 hours. This was a rate of 12.5 standard cubic feet of air per pound of ferrophos feed. The temperature of the charge tended to rise as the period of reaction went along, with the result that the amount of water played on the exterior of the reactor had to be adjusted to take into account the increasing temperature. The reaction mixture was tapped into a ladle where it separated into an upper layer of concentrate and a lower layer of refined ferrophos which contained 24.2% phosphorus, 0.8% vanadium, 0.9% chromium and 69.5% iron. The concentrate contained 7.8% vanadium, 8.4% chromium, 22.6% iron and 15.2% phosphorus. The concentrate and ferrophos compositions are given in terms of their elements, and not of the oxides of the elements.

At the end of 120 hours of operation, the converter was shut down and permitted to cool. It was found that the silicon carbide furnace lining was not damaged by the long period of operation, while the tuyeres which had measured 9 inches in length had been worn back 5 inches at the charge end. The tap hole had been enlarged about 2 inches, from an original diameter of 3½ inches.

*Example 2.—Reactor not lined with silicon carbide*

The procedure of Example 1 was followed with the exception that the Bessemer converter employed a lining of silica refractory in areas in contact with reactor charge, rather than the silicon carbide refractory employed in Example 1. In this case the reaction was run for only 18.5 hours, at which time the reactor had to be shut down because the brick lining had cracked extensively and failed, and the tuyeres had worn back to a point where they were no longer useful, namely to within 5 inches of their total length.

The rate of feed of ferrophos and of air were, respectively, only 3.5 tons per hour and 1000 standard cubic feet per minute, a rate of 8.5 standard cubic feed of air per pound of ferrophos feed. The temperature again was maintained at about 1500° C.; however, temperature surges were noted which could not be adjusted readily because of the inability of the reactor to conduct excessive reaction heat by exterior water cooling.

In this case, the residual ferrophos contained 23.0% phosphorus, 1.2% vanadium, 1.1% chromium and 71.2% iron. The concentrate contained 8.25% vanadium, 8.3% chromium, 23.1% iron and 18.2% phosphorus.

*Example 3.—Recovery of vanadium*

One hundred grams of vanadium concentrate obtained by the method of Example 1, and containing 13.9% of $V_2O_5$, 12.3% of $Cr_2O_3$ and 34.8% $P_2O_5$, was ground with 30% of sodium chloride until 60% of the charge was −100 mesh. This mixture was then charged into a muffle furnace and heated to a temperature of 760° C. at a rate that gave a contact time of approximately one hour. During this one hour period, the mixture was stirred every 5 minutes. Then the mixture was quenched in water. The quenched material was filtered and the solution and residue analyzed. The solution contained 10.4 grams of $V_2O_5$. The washed and dried residue contained 3.4% $V_2O_5$. This represented a 75% recovery of vanadium from the salt roast. This residue was reroasted under similar conditions to those employed in the first stage roast using 20% salt at a temperature of 800° C. for one hour. The repeat of the roasting operation was carried out on the leached residue from the first stage roast to increase recovery. The second treatment produced a calcine which when leached, washed and dried yielded 1.8 grams of $V_2O_5$ in the leaching water and a residue containing 1.8% $V_2O_5$. The two $V_2O_5$ recoveries provided a total recovery of $V_2O_5$ in solution of 88%. This vanadium value was in the form of water-soluble $Na_2V_2O_7$, from which the vanadium metal can be recovered readily.

*Example 4.—Recovery of vanadium*

The procedure of Example 3 was followed, except that in this case, the concentrate treated was that derived from Example 2, in which the operation was carried out in a silica lined converter. In this case, vanadium extracted after the first roasting with sodium chloride was 20% as compared with 75% recovered with the first salt roasting of the product from the concentrate of Example 1, as shown in Example 3 above. The second roast together with the first yielded only a total of 49.9% of vanadium recovery whereas a total recovery of 88% of the vanadium in the concentrate was recovered by the second roast employing the concentrate derived by the method of Example 1.

*Example 5.—Other silicon carbide refractories*

When the procedure of Example 1 was repeated employing as the converter lining silicon carbide refractories produced by bonding of particles of silicon carbide with either oxides or oxynitrides, results similar to those obtained in Example 1, namely ability to run the reactor over a long period and to cool the reaction charge at a high oxidation rate without cracking of the furnace lining, were achieved. Similar results were obtained when a self-bonded silicon carbide refractory lining was employed.

The above examples demonstrate that a Bessemer converter having a silicon carbide lining can be employed for long periods of time and at high oxidant and ferrophos fed rates without damage to the converter. This is in sharp contrast to the short operating time which must be suffered when the typical metallurgical process refractory lining, namely silica, is employed in place of the silicon carbide lining. It has been observed in other experiments that other refractory linings, namely, alumina, various aluminum silicates, and the like have useful lives essentially no longer than that encountered with the silica lining. The herein silicon carbide linings appear to be unique for the present reaction, in their ability to stand up under the arduous conditions encountered in ferrophos treatment.

As a further example of the importance of the ability of the silicon carbide furnace lining to stand up under the ferrophos oxidation conditions, the Bessemer converter when it was lined with silica refractory could be operated during a month for only a total of 146 hours in 8 different runs. These runs could be conducted at a rate of feed of only 3.5 tons of crude ferrophos per hour, and 1000 standard cubic feet of air per minute. The remaining time was employed in permitting the reactor to cool in order that it could be repaired and in relining and heating the reactor to where it could produce refined ferrophos.

When silicon carbide lining was employed, the operating time of the reactor in a month jumped to four runs totalling 490 hours, over which period 4.8 tons of crude ferrophos was fed per hour, and 2000 standard cubic feet of air introduced per minute. The higher rate of air feed possible with the silicon carbide reactor led to a more complete oxidation of the vanadium in the silicon carbide lined converter to a higher oxidation state with the result, as evidenced in Examples 3 and 4 above, that the extent of recovery of vanadium from the concentrate produced in the silicon carbide lined converter was much greater than that from the concentrate produced in the silica lined converter. This was achieved without substantial damage to the bulk of the silicon carbide lining in the converter, whereas in the case of the silica lined converter, the lining was extensively damaged.

Pursuant to the requirements of the patent statutes, the principle of this invention has been explained and exemplified in a manner so that it can be readily practiced by those skilled in the art, such exemplification including what is considered to represent the best embodiment of the invention. However, it should be clearly understood that, within the scope of the appended claims the invention may be practiced by those skilled in the art and hav-

We claim:

1. In the method of refining a vanadium and chromium bearing crude ferrophos by heating said ferrophos to a temperature of between 1300° and 1560° C. in the presence of an oxygen-containing gas in amounts sufficient to provide an oxidizing atmosphere until a concentrate having a vanadium content of from about 10 to 15% expressed as $V_2O_5$ and a chromium content of about 8–12% expressed as $Cr_2O_3$ is separated from a residual refined ferrophos having a phosphorus content of at least 23%, the improvement which comprises initially heating said crude ferrophos in a reactor lined with a refractory made up of silicon carbide particles bonded together into an adherent mass, and thereafter rapidly cooling the outer surface of said refractory by passing a cooling fluid in heat exchange relationship therewith to remove heat evolved in said reactor in order to maintain the temperature of said ferrophos at about 1300°–1560° C., whereby said ferrophos and said reactor can be rapidly cooled without cracking of said refractory, and recovering said concentrate and said residual, refined ferrophos.

2. Process of claim 1 wherein said cooling fluid is water.

3. Method of claim 1 in which the silicon carbide refractory is a silicon carbide composed of silicon carbide particles bonded together.

4. Method of claim 1 in which the silicon carbide refractory is composed of silicon carbide particles bonded together with a refractory.

5. Method of claim 1 in which the silicon carbide refractory is composed of silicon carbide particles bonded together with a nitride.

6. Method of claim 1 in which the silicon carbide refractory is composed of silicon carbide particles bonded directly to themselves.

References Cited by the Examiner

UNITED STATES PATENTS

| | | | |
|---|---|---|---|
| 1,534,819 | 4/1925 | Von Seth | 75—84 |
| 1,654,820 | 1/1928 | Koenig | 75—84 |
| 2,467,039 | 4/1949 | Kirschbaum et al. | 75—51 |
| 2,859,107 | 11/1958 | Brudin et al. | 75—121 |
| 3,154,410 | 10/1964 | Darrow et al. | 75—101 |

OTHER REFERENCES

Hampel: Rare Metals Handbook, 1st Edition, Reinhold Publishing Co., New York, N.Y.; 1954 (pages 578–592).

OSCAR R. VERTIZ, *Primary Examiner.*

O. F. CRUTCHFIELD, *Assistant Examiner.*